(12) United States Patent
Green

(10) Patent No.: US 7,666,383 B2
(45) Date of Patent: Feb. 23, 2010

(54) METHOD TO PRODUCE HYDROGEN OR SYNTHESIS GAS AND CARBON BLACK

(75) Inventor: Martin C. Green, Boxborough, MA (US)

(73) Assignee: Cabot Corporation, Boston, MA (US)

( * ) Notice: Subject to any disclaimer, the term of this patent is extended or adjusted under 35 U.S.C. 154(b) by 433 days.

(21) Appl. No.: 11/398,818

(22) Filed: Apr. 6, 2006

(65) Prior Publication Data

US 2006/0228290 A1    Oct. 12, 2006

Related U.S. Application Data

(60) Provisional application No. 60/668,754, filed on Apr. 6, 2005.

(51) Int. Cl.
*C09C 1/48* (2006.01)
*C01B 3/12* (2006.01)
*C01B 3/24* (2006.01)

(52) U.S. Cl. ............... 423/450; 423/449.1; 423/650; 423/655

(58) Field of Classification Search ............... 423/450, 423/449.1, 418.2, 650, 655, 656, 658.2
See application file for complete search history.

(56) References Cited

U.S. PATENT DOCUMENTS

| | | | |
|---|---|---|---|
| 1,418,385 A | | 6/1922 | Masson |
| 2,541,237 A | * | 2/1951 | Goodson ............... 208/60 |
| 2,672,402 A | * | 3/1954 | Stokes ............... 423/450 |
| 2,796,332 A | * | 6/1957 | Pollock ............... 423/450 |
| 2,809,104 A | | 10/1957 | Strasser et al. |
| 3,290,251 A | | 12/1966 | Nelson |
| 3,401,020 A | * | 9/1968 | Kester et al. ............... 423/450 |
| 3,607,065 A | * | 9/1971 | Forseth et al. ............... 423/458 |
| 3,703,052 A | | 11/1972 | Linden |
| 3,847,967 A | | 11/1974 | Lincoln et al. |
| 3,854,896 A | | 12/1974 | Switzer et al. |
| 3,952,087 A | * | 4/1976 | Antonsen et al. ............... 423/450 |
| 3,972,803 A | | 8/1976 | Wolk et al. |
| 4,007,129 A | * | 2/1977 | Naber et al. ............... 252/373 |
| 4,013,428 A | | 3/1977 | Babbitt |

(Continued)

FOREIGN PATENT DOCUMENTS

DE    34226371    11/1985

(Continued)

OTHER PUBLICATIONS

R.H. Williams et al., Producing Electricity from Coal with Low Carbon Dioxide Emissions, Jun. 1991, www.princeton.edu/~energy/publications/pdf/1991/Williams_91_Producing_Fuel_ & _ Electricity.pdf, p. 1-4.*

(Continued)

*Primary Examiner*—Jerry Lorengo
*Assistant Examiner*—Jared Wood

(57) ABSTRACT

A method to produce hydrogen gas or synthesis gas is described and involves the use of a staged reactor. The present invention further relates to effectively running a process such that efficient quantities of hydrogen gas are produced, along with economically useful amounts of carbon black. A combined facility utilizing a carbon black manufacturing plant and a refinery plant are further described, as well as products made by the various methods of the present invention.

56 Claims, 1 Drawing Sheet

U.S. PATENT DOCUMENTS

| | | | |
|---|---|---|---|
| 4,017,272 A | 4/1977 | Anwer et al. |
| 4,025,318 A | 5/1977 | Moody et al. |
| 4,101,639 A | 7/1978 | Surovikin et al. |
| 4,113,602 A | 9/1978 | Gorbaty et al. |
| 4,128,624 A | 12/1978 | Tamers |
| 4,159,236 A | 6/1979 | Schmid |
| 4,159,237 A | 6/1979 | Schmid |
| 4,203,823 A | 5/1980 | Carr et al. |
| 4,211,669 A | 7/1980 | Eakman et al. |
| 4,237,092 A | 12/1980 | Lewis |
| 4,261,964 A | 4/1981 | Scott et al. |
| 4,272,399 A | 6/1981 | Davis et al. |
| 4,282,199 A | 8/1981 | Lamond et al. |
| 4,296,087 A | 10/1981 | Lewis |
| 4,308,242 A | 12/1981 | Horton |
| 4,318,890 A | 3/1982 | Monahan |
| 4,319,892 A | 3/1982 | Waghorne et al. |
| 4,319,893 A | 3/1982 | Hatch et al. |
| 4,338,108 A | 7/1982 | Isalski et al. |
| 4,343,624 A | 8/1982 | Belke et al. |
| 4,380,461 A | 4/1983 | Haslam et al. |
| 4,460,558 A | 7/1984 | Johnson |
| 4,465,587 A | 8/1984 | Garg et al. |
| 4,483,691 A | 11/1984 | McShea, III et al. |
| 4,490,346 A | 12/1984 | Cheng |
| 4,496,373 A | 1/1985 | Behr et al. |
| 4,547,205 A | 10/1985 | Steacy |
| 4,548,619 A | 10/1985 | Steacy |
| 4,578,089 A * | 3/1986 | Richter et al. | 95/101 |
| 4,606,809 A | 8/1986 | Garg |
| 4,636,375 A | 1/1987 | Rothbühr et al. |
| 4,676,063 A | 6/1987 | Goebel et al. |
| 4,696,680 A * | 9/1987 | Ghate et al. | 95/103 |
| 4,740,222 A | 4/1988 | Mehra |
| 4,786,291 A | 11/1988 | Wilson |
| 4,806,695 A | 2/1989 | Vora et al. |
| 4,836,833 A * | 6/1989 | Nicholas et al. | 95/55 |
| 4,981,669 A | 1/1991 | Pinto |
| 4,983,278 A | 1/1991 | Cha et al. |
| 5,011,670 A | 4/1991 | Davis et al. |
| 5,066,476 A | 11/1991 | Wetzel et al. |
| 5,073,356 A | 12/1991 | Guro et al. |
| 5,084,362 A | 1/1992 | Farooque |
| 5,152,976 A | 10/1992 | Fong et al. |
| 5,164,054 A | 11/1992 | Cha et al. |
| 5,190,739 A * | 3/1993 | MacKay et al. | 423/450 |
| 5,198,084 A | 3/1993 | Cha et al. |
| 5,232,697 A | 8/1993 | Bahrani |
| 5,354,547 A | 10/1994 | Rao et al. |
| 5,427,762 A | 6/1995 | Steinberg et al. |
| 5,435,940 A | 7/1995 | Doering et al. |
| 5,455,016 A | 10/1995 | Choe et al. |
| 5,472,986 A | 12/1995 | Van Dijk |
| 5,597,474 A | 1/1997 | Kerby et al. |
| 5,602,298 A | 2/1997 | Levin |
| 5,728,361 A | 3/1998 | Holley |
| 5,738,708 A | 4/1998 | Peachey et al. |
| 5,955,039 A | 9/1999 | Dowdy |
| 5,956,970 A | 9/1999 | Sato et al. |
| 5,958,365 A | 9/1999 | Liu |
| 5,997,837 A | 12/1999 | Lynum et al. |
| 6,010,605 A | 1/2000 | Tarancon |
| 6,033,793 A | 3/2000 | Woods et al. |
| 6,096,195 A | 8/2000 | Streicher et al. |
| 6,173,002 B1 | 1/2001 | Robert |
| 6,182,614 B1 | 2/2001 | Toombs et al. |
| 6,214,090 B1 | 4/2001 | Dye et al. |
| 6,258,860 B1 | 7/2001 | Weedon et al. |
| 6,302,943 B1 | 10/2001 | Johnson et al. |
| 6,306,917 B1 | 10/2001 | Bohn et al. |
| 6,319,395 B1 | 11/2001 | Kirkbride et al. |
| 6,349,678 B1 | 2/2002 | Toombs et al. |
| 6,350,371 B1 | 2/2002 | Lokhandwala et al. |
| 6,379,645 B1 | 4/2002 | Bucci et al. |
| 6,495,610 B1 | 12/2002 | Brown |
| 6,523,348 B1 | 2/2003 | Acharya et al. |
| 6,527,832 B2 | 3/2003 | Oku et al. |
| 6,550,252 B2 | 4/2003 | Wallace et al. |
| 6,559,348 B1 | 5/2003 | Aittamaa et al. |
| 6,560,989 B1 | 5/2003 | Roberts et al. |
| 6,565,627 B1 | 5/2003 | Golden et al. |
| 6,578,377 B1 | 6/2003 | Licht et al. |
| 6,596,780 B2 * | 7/2003 | Jahnke et al. | 518/700 |
| 6,627,666 B1 | 9/2003 | Pedersen |
| 6,656,617 B2 | 12/2003 | Aoyama et al. |
| 6,660,064 B2 | 12/2003 | Golden et al. |
| 6,702,936 B2 | 3/2004 | Rettger et al. |
| 2001/0026786 A1 * | 10/2001 | Green | 423/458 |
| 2002/0006535 A1 | 1/2002 | Woods et al. |
| 2002/0014153 A1 | 2/2002 | Baksh et al. |
| 2002/0072644 A1 | 6/2002 | Wagner |
| 2002/0156177 A1 * | 10/2002 | Freund | 524/496 |
| 2003/0074839 A1 | 4/2003 | Maruko |
| 2003/0131582 A1 | 7/2003 | Anderson et al. |
| 2003/0167921 A1 | 9/2003 | Golden et al. |
| 2004/0018144 A1 * | 1/2004 | Briscoe | 423/652 |
| 2004/0045808 A1 | 3/2004 | Fabry et al. |
| 2004/0081614 A1 * | 4/2004 | Ying et al. | 423/656 |
| 2004/0115492 A1 | 6/2004 | Galloway |
| 2004/0118745 A1 | 6/2004 | Rettger et al. |
| 2004/0159233 A1 | 8/2004 | Simmons et al. |
| 2004/0029983 A1 | 12/2004 | Yakobson |
| 2005/0084437 A1 * | 4/2005 | Cox et al. | 423/243.01 |
| 2006/0228290 A1 * | 10/2006 | Green | 423/449.1 |

FOREIGN PATENT DOCUMENTS

| | | |
|---|---|---|
| DE | 16951282 | 6/1998 |
| DE | 19800704 | 4/1999 |
| EP | 0 928 817 A1 | 7/1999 |
| EP | 1 043 367 A1 | 10/2000 |
| EP | 1382568 | 1/2004 |
| EP | 1391240 | 2/2004 |
| GB | 191505098 | 3/1916 |
| GB | 927790 | 6/1963 |
| JP | 57-027902 | 2/1982 |
| RU | 2088518 C1 | 8/1997 |
| WO | WO 97/03133 | 1/1997 |
| WO | WO 98/00558 | 1/1998 |
| WO | WO 01/70653 | 9/2001 |
| WO | WO 03/078308 | 9/2003 |
| WO | WO 2004/046027 | 6/2004 |
| WO | WO 2004/046029 | 6/2004 |

OTHER PUBLICATIONS

Office Action from corresponding Russian Federation Patent Application No. 2007140885, dated Mar. 4, 2009, three pages.

Orlov V. Yu, "*Manufacturing and Use of Carbon Black for Rubbers*," Yaroslavl, Aleksander Rutman Publishers, 2002, p. 100, translated.

Translation of Official Action from corresponding Russian Federation Patent Application No. 2007140885 (3 pages).

Orlov V. Yu, "Production and Use of Carbon Black for Rubbers," Yaroslavl, Aleksander Rutman Publishers, 2002, pp. 166-168, English translation (4 pages).

English translation of "Oil Residue Gasification," from Chemical Encyclopedia, Sovetskaya Entsiklopediya Publishers, Moscow, 1988, vol. 1, p. 451 (2 pages).

\* cited by examiner

METHOD TO PRODUCE HYDROGEN OR SYNTHESIS GAS AND CARBON BLACK

This application claims the benefit under 35 U.S.C. §119 (e) of prior U.S. Provisional Patent Application No. 60/668, 754 filed Apr. 6, 2005, which is incorporated in its entirety by reference herein.

The present invention relates to various methods to produce hydrogen or synthesis gas. The present invention further relates to the use of a method to produce hydrogen or synthesis gas which is in communication with a refinery or other user of hydrogen or synthesis gas. Also, the present invention relates to the production/recovery of carbon black and one or more gases, such as CO, $CO_2$, and $H_2$, or gases containing one or more of these gases.

Various attempts have been made to design methods for the preparation of gaseous fuel and carbon black. For instance, U.S. Pat. No. 2,605,178 describes a process for producing carbon monoxide and hydrogen using a fluidized bed of powdered non-carbonaceous refractory material in a confined reaction zone. Liquified hydrocarbonaceous materials such as tars, pitches, low grade coals, and the like are preferably used. A mixture of oxygen and steam are charged into the reaction zone and the temperature in the fluidized bed is preferably maintained below 2,000° F. A gaseous mixture of carbon monoxide and hydrogen are recovered. Secondary oxygen is added in an attempt to react the substantial quantities of soot and vaporizable hydrocarbons formed during the cracking. The process in this patent is not concerned with obtaining usable carbon black or using a staged reactor. In addition, there is no concern or mention of sulfur removal.

U.S. Pat. No. 2,809,104 relates to the gasification of liquid fuels. The patent describes the reaction of heavy liquid hydrocarbons, such as heavy crude oils, with steam and free oxygen to produce a mixture of gaseous products which contain carbon monoxide and hydrogen. The patent further describes that this gaseous product can be used as a synthesis gas, fuel gas, or a source of hydrogen for various purposes. In this particular process, a heavy oil feed is injected into a stream of steam and the resulting mixture is subjected to highly turbulent flow conditions. In this patent, various amounts of the carbon monoxide, carbon dioxide, hydrogen, nitrogen, methane, and combined carbonyl sulfide and hydrogen sulfide are provided in mole percent dry basis. In this process, there is no effort to make carbon black along with the gaseous products, and no staged reactor is used.

In U.S. Pat. No. 2,987,386, a process for the production of carbon monoxide and hydrogen from fossil fuels by reaction with oxygen is described. In the process, the product consists essentially of carbon monoxide and hydrogen and relatively small amounts of water vapor, carbon dioxide, and entrained carbonaceous solid which can be very fine carbon particles which can be useful as carbon black. The entrained carbon can be removed from the product gases by contacting the cooled synthesis gas with water. Again, the primary purpose of this process is not to make or recover substantial quantities of carbon black. Furthermore, no staged reactor is used. In addition, there is no effort to control or remove sulfur.

U.S. Pat. No. 2,564,736 relates to a process of producing carbon black. In particular, this patent describes the burning of streams of natural gas and oxygen, in the absence of air, and reports an increase in the yield of carbon black and also reports producing a valuable gaseous product. The patent describes using the Fischer-Tropsch synthesis principle whereby a gaseous mixture of carbon monoxide and hydrogen pass over a catalyst under suitable conditions of temperature and pressure to yield hydrocarbons in the liquid fuel range. In this patent, a carbon black producing furnace is used, and natural gas and oxygen are supplied. As part of the process, the patent describes re-circulating a substantial portion of the tail-gas and mixing it with the oxygen to form a dilute oxygen mixture which may then be burned with the natural gas. The patent reports that the re-introduction of carbon monoxide and hydrogen with the oxygen delivered to the combustion space has a favorable effect in suppressing some of the carbon destroying reactions. Unlike the process of the '736 patent, preferably, no recycling of the tail-gas is occurring in the process of the present invention. U.S. Pat. No. 2,672,402 shows a similar process.

U.S. Pat. No. 2,731,328 relates to a process to manufacture carbon black and involves in one embodiment the manufacture of carbon black from a gas containing carbon monoxide. In particular, low-grade carbonaceous material is burned at a high temperature in the presence of free oxygen to produce carbon monoxide as a combustion product. The product is then quenched and contacted with a solid refractory material in a conversion chamber to form carbon black and carbon dioxide as a by-product, and to a somewhat lesser extent, to form carbon black and water as a by-product.

Thus, while there have been previous attempts to form gaseous products alone or with carbonaceous material, such as carbon black, it has been difficult to create a process which will efficiently and effectively form substantial amounts of carbon black in combination with substantial amounts of hydrogen or hydrogen and carbon monoxide and to remove the sulfur from the gases. In addition, previous attempts have not taken this combination of making carbon black and hydrogen gas and provided a truly useful amount of gas to be provided to a user of hydrogen gas, such as a refinery along with a useful amount of carbon black. In addition, previous attempts were limited by the type of carbon black manufactured.

Thus, previous attempts essentially had to choose whether to concentrate on making a desirable carbon black product and a less than desirable hydrogen or synthesis gas, or the opposite, namely forming a useful synthesis gas with less than desirable carbon black production.

SUMMARY OF THE INVENTION

A feature of the present invention is to overcome one or more of the shortcomings identified above.

Another feature of the present invention is to provide a process which produces a useful hydrogen gas or hydrogen and carbon monoxide gas optionally along with acceptable amounts of quality carbon black.

A further feature of the present invention is to provide a combined facility which includes carbon black manufacturing and refinery operations.

A further feature of the present invention is to provide an essentially "green" operation, which significantly reduces the emissions of gases to the environment, including sulfur emissions.

Additional features and advantages of the present invention will be set forth in part in the description that follows, and in part will be apparent from the description, or may be learned by practice of the present invention. The objectives and other advantages of the present invention will be realized and attained by means of the elements and combinations particularly pointed out in the description and appended claims.

To achieve these and other advantages and in accordance with the purposes of the present invention, as embodied and broadly described herein, the present invention relates to a method to produce at least one gas and carbon black. The gas comprises at least hydrogen gas. The method involves converting at least a portion of at least one hydrocarbon feedstock to carbon black in a reactor and in the presence of combustion gases generated by burning at least one fuel in a gas that contains at least oxygen. The fuel can be a portion of the hydrocarbon feedstock and/or can be a separate fuel source. The carbon black is present in a product stream and the product stream contains carbon black, one or more impurities, hydrogen gas, and CO gas. The impurities can comprise sulfur-containing material(s), nitrogen-containing material(s), or both. In this method, the gas containing oxygen can be pure oxygen or can contain a majority amount of oxygen. The method further includes removing substantially all of the carbon black from the product stream and removing at least a portion of the impurities from the product stream. Optional steps can be included in this method, such as converting at least a portion of the CO gas in the product stream to $CO_2$, for instance, by conducting a shift reaction which will also produce additional hydrogen gas in preferred embodiments. The method can further optionally include transferring the product stream, which can contain primarily hydrogen gas alone or with CO through a process unit for use as a fuel or chemical feedstock. The process unit can comprise an oil refinery.

The present invention also relates to a method to produce hydrogen gas or hydrogen gas along with carbon monoxide. The process involves introducing oxygen and at least one fuel in a reactor, e.g., staged reactor, to form a hot combustion gas stream. At least one hydrocarbon feedstock is introduced into the hot combustion gas stream to form a product stream which contains carbon black, CO, $H_2$, and sulfur-containing material. The process further involves removing the carbon black from the product stream and also removing sulfur-containing material from the product stream. The process can then further include introducing steam to the remaining parts of the product stream and removing $CO_2$ to obtain substantially pure $H_2$ gas. The process can be achieved with or without diverting any portion of the product stream to the hot combustion gas stream or to the fuel stream or oxygen stream. The process preferably produces a product stream, after removing sulfur-containing material, which has a very low sulfur amount.

The present invention further relates to a combined facility which includes a carbon black manufacturing plant and a refinery plant wherein the carbon black manufacturing plant includes a carbon black reactor, such as a staged carbon black reactor, and includes means to remove carbon black from a product stream, means to remove sulfur from a product stream, means to introduce steam to the product stream, optional means to remove $CO_2$; and means to transfer the $H_2$ gas to a refinery. Preferably, the combined facility is arranged such that the carbon black manufacturing plant is in fluid communication with a refinery or a similar user of hydrogen gas.

The present invention further relates to carbon black produced by processes of the present invention.

It is to be understood that both the foregoing general description and the following detailed description are exemplary and explanatory only and are intended to provide a further explanation of the present invention, as claimed.

The accompanying drawing, which is incorporated in and constitute a part of this invention, illustrates various embodiments of the present invention and together with the description, serve to explain the principles of the present invention.

DETAILED DESCRIPTION OF THE PRESENT INVENTION

Figure 1:
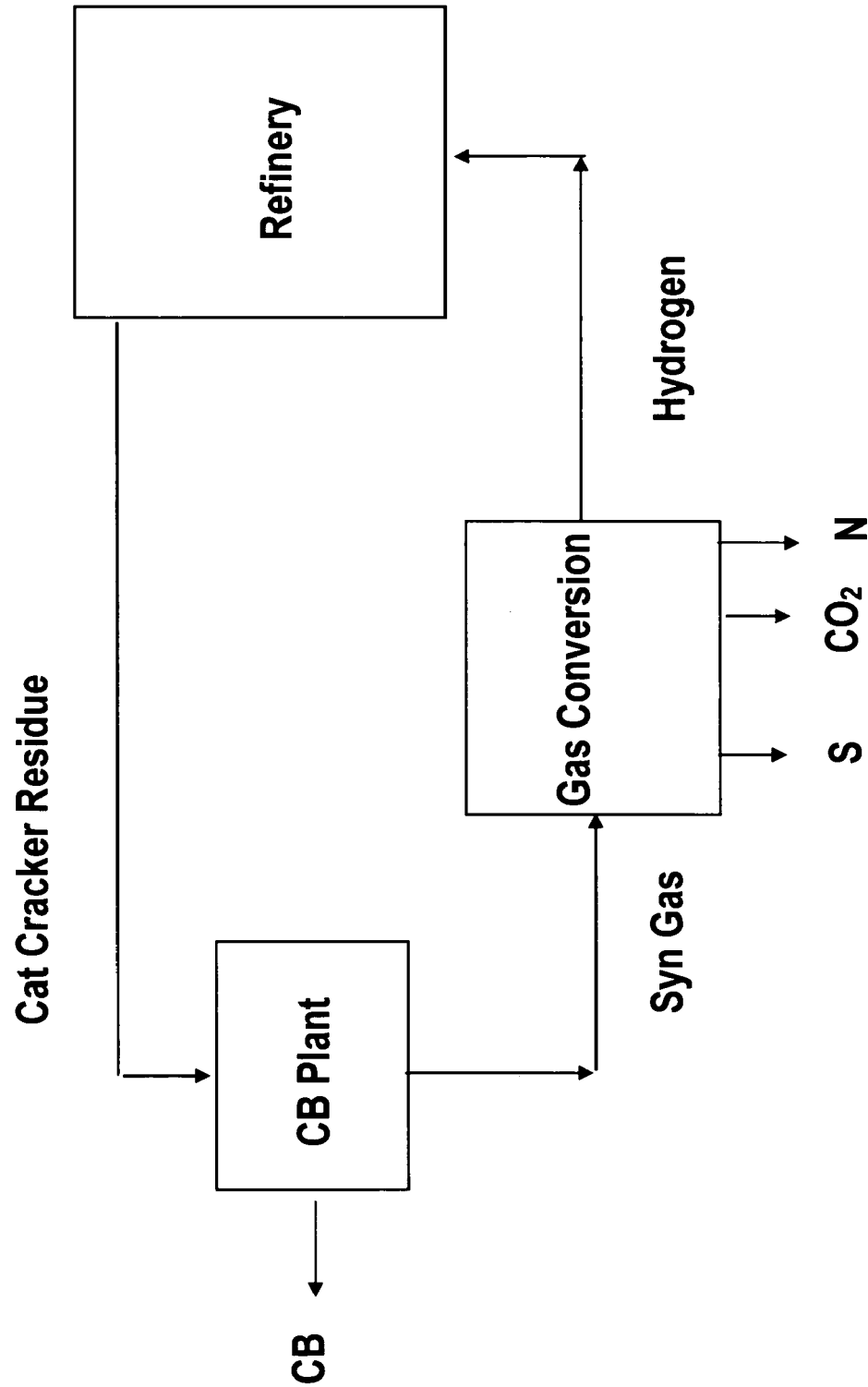
FIG. 1 is a flow diagram showing one embodiment of the preferred process of the present invention.

The present invention relates to a method to produce hydrogen gas or hydrogen gas with carbon monoxide or other gases, which can be especially useful to a refinery or other users of hydrogen or synthesis gas. The present invention permits the ability to produce useful quantities of carbon black along with the useful quantities of hydrogen gas or hydrogen gas and carbon monoxide. The quality of the carbon black, as well as the quality of the hydrogen gas alone or with carbon monoxide, is preferably also commercially acceptable. The process of the present invention permits a useful combination of carbon black manufacturing with hydrogen gas production and by achieving both, a "green" process is developed which can permit the significant reduction in emissions, such as tail gas emissions, as well as sulfur and/or nitrogen emissions, e.g., at the location where the process is taking place. In addition, the processes of the present invention permit a very economical use of the combined facility to avoid waste.

In one or more processes of the present invention, carbon black, along with one or more gases, such as synthesis gases, hydrogen gas, carbon monoxide, or mixtures thereof, can be produced, preferably in useful quantities, along with useful quantities of useable carbon black. For purposes of the present invention, a synthesis gas typically is understood as mixtures of at least hydrogen and carbon monoxide, which can be, for instance, useful for the synthesis of unsaturated hydrocarbons and oxygenated organic liquids, such as in the Fischer Tropsch type of synthesis. The synthesis gas can contain amounts of nitrogen, carbon dioxide, or mixtures thereof.

In one embodiment, a method to produce hydrogen gas is achieved, wherein the method includes introducing oxygen and optionally at least one fuel in a reactor, such as a staged reactor, to form a hot combustion gas stream. At least one hydrocarbon feedstock is introduced prior to, during, and/or after forming the hot combustion gas stream to form a product stream. This product stream preferably contains at least carbon black, CO, $H_2$, and also sulfur-containing materials, such as $H_2S$, $CS_2$, $SO_2$, $SO_x$ and the like, or nitrogen-containing materials (e.g., $NO_x$), or both. In this process, the carbon black can then be removed or recovered from the product stream. Further, the sulfur-containing materials and/or nitrogen containing materials can be removed from the product stream. Optionally, water or steam can be introduced to the remaining parts of the product stream which can preferably be at least carbon monoxide and $H_2$ and primarily CO and $H_2$. The water or steam converts at least some of the CO to $CO_2$ and forms additional hydrogen gas. Then, the $CO_2$ can be removed to obtain substantially pure hydrogen gas. The process can preferably be achieved without diverting any portion of the product stream to the hot combustion gas stream or to the fuel stream or to the oxygen stream. In other words, the present invention optionally does not recycle any of the tail gas back to the combustion area or to any pre-combustion area. A portion of the product stream can optionally be diverted. For example, from about 1% to about 20% or more, or from about 1% to about 10%, or from about 1% to about 5% of the product stream can optionally be diverted, wherein these percents are based on volume.

In one or more embodiments, the present invention relates to a method to produce at least one gas, wherein the gas can comprise at least hydrogen gas alone or with other gases. The method comprises converting at least a portion (e.g., from 1% to 90% by weight, or from 10% to 70% by weight) of at least one hydrocarbon feedstock to carbon black in a reactor, such as a carbon black reactor. This conversion to carbon black occurs in the presence of combustion gases which are generated by burning at least one fuel in a gas containing oxygen so that at least a portion of the hydrocarbon feedstock is converted to carbon black. The gas can be primarily oxygen. The fuel source can be a portion of the hydrocarbon feedstock and/or can be a separate fuel source. When carbon black is formed, it is present in a product stream. The product stream comprises carbon black, hydrogen gas, optionally CO gas, and one or more impurities. The impurities can comprise sulfur-containing species and/or nitrogen-containing species and/or other impurities. A fuel can optionally be used during the combustion. Further, in this process, the carbon black that is formed is removed and generally this means that substantially all of the carbon black is removed (e.g., at least 80% wt % of the carbon black that is formed is removed, such as 80 wt % to 99 wt % or more). Further, at least a portion of the impurities can also be removed from the product stream.

As an option, the method can further include converting at least a portion of the CO gas that is present in the product stream to $CO_2$. As an example, the conversion of at least a portion of the CO gas to $CO_2$ can involve contacting the product stream that contains the CO gas with water and/or steam, for instance, in a shift reactor. When steam is introduced, for instance, for the shift reactor, the steam can be introduced in the presence of a catalytic bed. The shift reactor will generally react CO with $H_2O$ to form $CO_2$, hydrogen gas, and some CO gas will typically be present as well. Once the $CO_2$ gas is formed, as an option, this gas can be removed and optionally recovered and used for a variety of uses. The removal and optional recovery of the $CO_2$ gas can occur by passing the product stream that has just gone through, for instance, a shift reaction, through at least one scrubber, or at least one pressure swing adsorber, or at least one membrane, or any other purification device, or any combinations thereof in order to remove the $CO_2$ gas from the product stream. As an example, one or more of these processes can remove at least 50% by volume of the $CO_2$ present, at least 75% of the $CO_2$ present, at least 90% of the $CO_2$ present, or at least 95% of the $CO_2$ present by volume in the product stream. For instance, from about 60% to about 98% by volume of the $CO_2$ present in the product stream can be removed by one or more of these processes. The converting of at least of at least a portion of the CO gas to $CO_2$ can occur prior to any step of removing at least a portion of the impurities, and/or during the step of removing at least a portion of the impurities, and/or after the step of removing at least a portion of the impurities.

As stated, an amount of CO gas can remain in the product stream after converting at least a portion of the CO gas in the product stream to $CO_2$. As an option, the process can further comprise removing at least a portion of the CO gas from the product stream. For instance, this can be done by passing the product stream through at least one pressure swing adsorber and/or other purification device. Further, at this point, by removing the remaining portion of the CO gas using, for instance, at least one pressure swing adsorber, this step can further remove at least a portion of methane, nitrogen, or combinations thereof that may be present in the product stream as impurities. As an option, any CO gas that is removed can be recycled or reprocessed through a shift reactor to convert a further portion of the CO gas to $CO_2$ along with additional hydrogen gas which can be added to the product stream. By removing the CO gas through these various means, the CO gas remaining in the product stream after these various purification processes and removal steps can be less than 10% by volume, less than 5% by volume, or less than 2% by volume, less than 1% by volume, or less than 500 ppm by volume in the product stream.

The reactor that can be used in the process to convert at least a portion of the hydrocarbon feedstock to carbon black and form a product stream containing hydrogen gas can be a variety of reactors, such as carbon black reactors. For example, the reactor can be a staged reactor. Further, as an option, the hydrocarbon feedstock can be introduced into the reactor by stage additions. Also, as an example, the hydrocarbon feedstock can comprise a primary hydrocarbon feedstock and one or more secondary hydrocarbon feedstocks. In this arrangement, at least a portion (e.g., from 1% to 90% by weight) of the primary hydrocarbon feedstock is converted to carbon black downstream of where one or more secondary hydrocarbon feedstocks are introduced into the reactor. In such an arrangement, at least a portion of the secondary hydrocarbon feedstock may or may not be convened to carbon black as an option. In the process of the present invention, as an option, the hydrocarbon feedstock can have a sulfur level of at least 4% by weight based on the weight of the hydrocarbon feedstock. The sulfur level can be from about 0.05% to about 5% by weight of the hydrocarbon feedstock. The present invention, through the various processing, does have the ability to use hydrocarbon feedstock that has significantly higher sulfur levels than commonly used by carbon black manufacturers. The present invention has the ability to remove sulfur through various techniques including the formation of carbon black and the processing of the product stream through various purification/separation techniques, such as scrubbers that can remove sulfur, and therefore can handle hydrocarbon feedstocks having high sulfur levels, such as from about 4% to about 10% or higher by weight of the hydrocarbon feedstock. As an option, hydrocarbon feedstocks having low sulfur levels can also be used, such as from about 0.1% to about 5% or amounts even lower than this range, based on the weight of the hydrocarbon feedstock. As an option, with respect to the processes of the present invention, the fuel and oxygen can be present in a fuel/oxygen equivalence ratio of from about 0 to about 2. As an option, the hydrocarbon feedstock can have a hydrogen to carbon mol ratio of from 0.5 to 3.5. As another option, the methods of the present invention can occur without recycling the product stream back to the reactor where the formation of the carbon black is occurring or prior to that point.

As an option, the methods of the present invention can comprise introducing at least one fuel into the reactor at a point prior to or where the converting is occurring. The fuel can comprise or primarily be natural gas, though other fuels can be used alone or in combination. In the present invention, the percent-by-volume of hydrogen gas produced and the rate percent of carbon black produced in the product stream can be controlled by various means. For instance, by varying the type of a hydrocarbon feedstock, the type of fuel when present, ratio of fuel when present, ratio of $O_2$ to hydrocarbon feedstock, relative feed rates of oxygen, fuel, and hydrocarbon feedstock, temperature of the feed gases, temperature of the hydrocarbon feedstock, the stoichiometric combustion rate, the stoichiometric carbon to hydrogen ratio in the hydrocarbon feedstock, or any combinations thereof, the ratio of carbon black to hydrogen gas that is formed in the process can be adjusted.

The reactor can be a staged reactor or a multi-staged reactor such as a two- or three-staged reactor. The reactor can be a water-cooled reactor. The reactor can be a carbon black reactor, such as described in U.S. Pat. No. 5,190,739, which is incorporated in its entirety herein and forms a part of the present application. "Staged" refers to the process where stage 1 is a burner which can produce a clean hot combustion gas substantially without the presence of solid carbon. Stage 2 is the zone where feedstock can be introduced into the hot gas stream from stage 1, and stage 3 is the reactor in which the formation of carbon black takes place and at the end of which the smoke can be quenched. When the term multistage is used, it typically refers to the injection of feedstock which may be in several places and the following terms have been used to describe multistage: retracted stinger, tickler, dual transition, and feedstock injection from the wall of the converging flow as well as from the wall of the restriction. The term "zone", "zoned," can be synonyms for "staged." In the present invention the process can be staged and optionally multistaged. In the present application, with any type of reactor, oxygen along preferably with at least one fuel is used to form a hot combustion gas stream. With respect to the oxygen, preferably, the oxygen is pure oxygen or a highly-pure oxygen. For instance, the oxygen can have a purity of at least 90% or at least 95% by volume and more preferably, a purity of at least 99%, such as 99.5% by volume or purer with respect to oxygen content. In at least one embodiment, the nitrogen level in the oxygen used is preferably below 5% by volume of the overall oxygen gas and, more preferably, is less than 1% by volume, and even more preferably, less than 0.5% by volume, such as from about 0.05% to about 0.5% by volume based on the overall volume of the gas. With respect to the fuel, the fuel can be a liquid fuel. The fuels can be in the gas, vapor, or liquid phase, including, but not limited to, natural gas, hydrogen, carbon monoxide, methane, acetylene, alcohols, kerosene, and the like. However, it is preferably useful to utilize fuels having a high content of carbon-containing components and, in particular, hydrocarbons. For example, streams rich in methane, such as natural gas, and modified or enriched natural gas are excellent fuels as are other streams containing high amounts of hydrocarbons, such as various hydrocarbon gases and liquids and refinery by-products including ethane, propane, butane, and pentane fractions, fuel oils, and the like. Most preferably, natural gas is used. The oxygen that is introduced may be pre-heated to a higher temperature, such as 1,000° F. or less.

The stream of hot gases can flow at an average velocity exceeding 30.5 m/s. The pressure differential between the combustion chamber and the reaction chamber can be at least 6.9 kPA, for instance, from about 10.3 kPA to 68.9 kPA. The hot combustion gases can be typically much hotter than traditional combustion gases. For instance, the temperature of the combustion gas stream prior to introduction of the hydrocarbon feedstock is from about 2,500° F. to about 5,500° F., and more particularly from about 4,000° F. to about 5,000° F. The hot gases can be propelled in a downstream direction and accelerated by introducing the gases into an enclosed feedstock injection stage of small diameter which may, if desired, be tapered or restricted such as a conventional venturi throat. At this point of the process, which may be considered the second stage, the hydrocarbon feedstock can be injected into the stream of hot combustion gases. The feedstock may be injected at any point subsequent to the point where the first stage combustion is complete. The hydrocarbon feedstock can be injected into the hot combustion gas stream under sufficient pressure to achieve desired penetration, thereby ensuring a high rate of mixing the hot combustion gases and the hydrocarbon feedstock. Suitable hydrocarbon feedstocks which are readily volatilizable under the conditions of the reaction are unsaturated hydrocarbons, such as acetylene, olefins, such as ethylene, propylene, butylenes; aromatics, such as benzene, toluene, and xylene; certain saturated hydrocarbons and other hydrocarbons such as kerosenes, naphthalenes, terpenes, ethylene tars, aromatic cyclics, catalytic cracker residues, coal tars, and the like. The feedstock may be injected substantially transversely from the outer periphery of the stream of the hot combustion gases in the form of a plurality of coherent or atomized streams which penetrate into the interior regions of the hot combustion stream. Alternatively, the feedstock may be injected substantially axially, or transversely from the inner periphery of the stream of hot combustion gases in the form of single or plurality of coherent or atomized streams. The hydrocarbon feedstock can be introduced as streams of liquid by forcing the liquid feedstock through a plurality of orifices having a diameter ranging from 0.05 cm to about 0.5 cm during an injection pressure sufficient to achieve the desired penetration or atomization. The amount of feedstock utilized can be adjusted in relation to the amounts of fuel and oxygen employed so as to result in an overall percent combustion for the carbon forming process ranging from about 15 percent to about 40 percent, and preferably from about 20 percent to about 25 percent.

A third stage of the multi-stage process can involve a reaction zone which can permit sufficient residence time for the carbon forming reaction to occur such that a product stream is formed containing carbon black, carbon monoxide, hydrogen gas, and sulfur-containing and/or nitrogen-containing material. This product stream is permitted to form prior to termination of the reaction by quenching. The residence time in each instance can depend upon the particular conditions and the particular black desired. The residence times of the present process can vary from as low as 1 m/s or less to about 500 m/s or more. Accordingly, after the carbon forming reaction has proceeded for the desired period of time, the reaction can be terminated, for instance, by spraying thereon a quench liquid, such as water, issuing from at least one spray nozzle. The hot effluent gases or the product stream containing the carbon blacks suspended therein can be passed downstream to conventional steps of cooling, separation, and collection of the carbon black. The separation of the carbon black from the gas stream can be readily accomplished by conventional means, such as a precipitator, cyclone separator, bag filter, or combinations thereof.

In the process of the present invention, the primary (fuel/oxygen) equivalence ratio can be from about 0 to about 2, such as from about 0.8 to about 1.

As an option, the product stream can contain primarily or substantially hydrogen gas. This can be achieved, as described above, by removing the CO, such as by converting at least portions of the CO to $CO_2$ and hydrogen gas through use of a shift reactor or other means. Further, impurities such as sulfur-containing materials and/or nitrogen-containing materials and/or other impurities can be removed through scrubbers, pressure swing adsorbers, membranes, and the like, such that the gas recovered is primarily hydrogen gas. As described in more detail below, at that point, the hydrogen gas can have a purity of at least 90% by volume in the product stream. As indicated above, the hydrogen gas can be even purified further by passing the product stream that contains primarily hydrogen through at least one or more pressure swing adsorbers, or one or more membranes, or other purification/separation devices or combinations thereof. In one embodiment, the product stream can contain at least $H_2$ and CO and the $H_2$ and the CO can be present in a mol ratio of from about 0.5 to 2 or from 2 (or above 2) to about 3.5 prior to any removal of the carbon black.

In the process, various impurities or portions thereof, can be removed from the product stream. This removal of the impurities can occur at any stage. For instance, the removal of the impurities can occur prior to removal of the carbon black, and/or after removal of the carbon black, and/or prior to the optional use of a shift reactor to convert the CO to $CO_2$ and hydrogen gas, and/or after such a shift reaction. For purposes of the present invention, impurities typically include, but are not limited to, sulfur-containing materials, methane, nitrogen-containing materials, acetylene, and other hydrocarbons. Examples include $NO_x$ (e.g., nitrogen oxides), $H_2S$, $CS_2$, $SO_2$, $SO_x$ (e.g., sulfur oxides), and the like. A portion of the impurities can be removed, for instance, from the product stream by passing the product stream though one or more scrubbers and/or other devices that are capable of removing such impurities. After passing the product steam through one or more scrubbers and/or other devices, for instance, the sulfur amount based on elemental sulfur, can be 100 ppm or less in the product stream. Preferably, the product stream once formed and after removal of the sulfur-containing material has a sulfur amount of about 100 ppm or less and more preferably 10 ppm or less such as from about 1 ppm to about 50 ppm or from about 5 ppm to about 10 ppm. The removal of the sulfur can be achieved by any means such as by a conventional scrubber that can remove sulfur-containing species.

In addition, through the various purification techniques mentioned herein, the impurities present in the product stream after processing, excluding $H_2O$ based on the dry weight basis, can have a total impurity content of 5% or less, 1% or less, such as from 100 ppm to 1% (wherein an impurity is any material that is not $H_2$, CO, $CO_2$, or $H_2O$).

As an option, in the present invention, the method of the present invention can result in gaseous emissions at the location of the reactor of sulfur in gas phase species (or sulfur-containing species (e.g., $SO_x$, $H_2S$, $SO_2$)) into the atmosphere of less than 5 wt % based on the total amount of sulfur (e.g., elemental sulfur) fed into the process. As an option, the gaseous emissions of the sulfur in gas phase species can be less than 10 wt % or less than 20 wt %, again, where this weight percent is based on the total amount of sulfur fed into the method. A range can be from 0.5 wt % to 10 wt % of sulfur in gas phase species, based on the total amount of sulfur fed into the method.

As an option, the method can result in gaseous emissions of carbon in gas phase species (or carbon-containing species, such as $CO_x$ (e.g., carbon containing oxides)), wherein the method results in gaseous emissions at the location of the reactor of carbon in gas phase species into the atmosphere of less than 10% by weight, or less than 20% by weight, or less than 30% by weight based on the total amount of carbon (e.g., elemental carbon) fed into the method. These ranges can be from 1 wt % to 30 wt %, or from 5 wt % to 25 wt % of carbon in gas phase species, based on the total amount of carbon fed into the method.

As an option, the method can result in gaseous emissions at the location of the reactor of nitrogen in gas phase species (or nitrogen-containing species, such as $NO_x$), into the atmosphere, such as less than 0.01 metric tonne per metric tonne of carbon black produced in the process, or less than 0.1 metric tonne, or less than 1 metric tonne per metric tonne of carbon black produced. A range can be from 0.001 metric tonne to 1 metric tonne of released nitrogen in gas phase species per metric tonne of carbon black produced in the process.

In the present invention, as an option, the method can form carbon black in the reactor in an amount of greater than 20% by weight, greater than 25% by weight, or greater than 30% by weight of the product stream, based on a dry basis. A range can be from 20% by weight to 60% by weight or more, or from 25% by weight to 50% by weight of the product stream, based on a dry basis. Other amounts of carbon black can be formed.

A portion of the sulfur that is present in the hydrocarbon feedstock can be removed by the formation of carbon black which then is present with the carbon black. Further, a portion of any metal present in the hydrocarbon can be removed by formation of the carbon black and therefore be present with the carbon black. The carbon black which is produced through this method can be removed through various techniques, such as, but not limited to, a cyclone, filtering, and/or washing the product stream containing carbon black with water.

The method can further comprise transferring the product stream, once the carbon black is removed and optionally impurities are removed and optionally CO is converted to $CO_2$ and hydrogen gas, to a process unit for use, for instance, as a fuel or chemical feedstock or other purpose. The process unit can comprise an oil refinery. In one embodiment, the process of forming the carbon black occurs at a carbon black manufacturing plant and the product stream is then transferred after various processing as described herein to an oil refinery for use.

One or more gases recovered from the process can be used or transferred to a refinery or other user of one or more of the recovered gases, such as hydrogen, CO, carbon dioxide, or any combinations thereof. The one or more gases can be transferred by pipelines or other means. For instance, the recovered gases can be stored in storage tanks or other holding facilities and subsequently transferred to the users of the gases using standard means to transport gases in a gas phase or liquefied gas phase with tanker trucks or railcars and the like. In a preferred setup, the refinery or other user of the one or more gases would be nearby, such that the gases could be immediately transferred to the refinery or other user by pipeline.

As an option, the carbon black that is produced by this process can be removed and can be a carbon black within an ASTM specification for carbon black, especially with respect to structure and/or surface area.

In the present invention, the $H_2$ and CO can be present in a mol ratio of from about 0.5 to about 1, or from about 1 to about 2, or from about 2 to about 3.5 in the product stream prior to any removal of the carbon black. Other mol ratios of the $H_2$ and CO can be present in the product stream prior to any removal of the carbon black.

As an option, in the present invention, using one or more processes of the present invention, at least 20% by weight of all sources of carbon being introduced into the reactor can be recovered in the form of carbon black. As an option, this amount can be at least 30%, or at least 50%, or at least 60%, or from about 25% to about 70% by weight of all sources of carbon being introduced into the reactor can be recovered in the form of carbon black.

In the present invention, at least 15 percent by weight of the carbon present in the hydrocarbon feedstock can be recovered as carbon black such as at least 30 percent by weight, or at least 40 percent by weight or more of the carbon present in the hydrocarbon feedstock can be recovered as carbon black. For instance, from about 15 percent by weight to about 65 percent by weight of the carbon present in the hydrocarbon feedstock can be recovered as carbon black.

The product stream, once formed, preferably has a low nitrogen level content such as 1 wt % or less, 5 wt % or less, or 10 wt % or less by weight of the product stream (e.g., from about 0.1 wt % to about 1 wt %). In at least one embodiment, the product stream containing carbon black, $H_2O$, $CO$, $CO_2$, and $H_2$ has impurities of 1 wt % or less, 5 wt % or less, or 10 wt % or less by weight of the product stream, wherein the impurities include nitrogen and/or other impurities.

With respect to the gases recovered in the processes of the present invention, in at least one embodiment, the hydrogen gas has a purity of at least 95% (by vol. %), such as from about 95% to about 99.99% (by vol. %) pure hydrogen gas. The purities can be higher. Other ranges for the purity of the recovered hydrogen gas can be from about 98% to 99.99% (by vol. %) or from about 99% to about 99.995% (by vol. %) or more. One or more of the recovered gases, such as hydrogen gas or carbon dioxide, can be subjected to any number of conventional purification methods to obtain a more purified gas.

Purification and/or removal methods that can remove one or more of the impurities described herein, include but are not limited to, scrubbers, catalyst beds, molecular sieves, adsorbents, pressure swing adsorptions, temperature swing adsorbers, use of zeolitic adsorbents, using getter materials, acceptor materials, and/or membranes (e.g., permeable membranes). As further examples, catalyst can be used, such as coronal-catalyst. Scrubbers, such as low pressure and/or high pressure scrubbers, can be used to remove impurities, like $SO_x$ and/or $NO_x$, and other impurities. The scrubbers can use aqueous scrubbing solutions, and/or aqueous regeneratable liquors, and/or alkali solutions, and/or water-soluble polymeric chelates and the like. Single or multiple venturi scrubbers and/or trayed emission scrubbers and/or back diffusion scrubbers can be used, and/or impingement surfaces. The gas(es) can be cleaned by agglomeration and/or absorption and/or adsorption. A centrifugal cyclone separator can be used. Scavenger compositions, such as Group IA metals or metal compounds, or polymers (e.g., macroreticulate polymers) or other compounds can be used. Adsorbers, such as adsorber towers and/or catalytic converters, can be used. Generally, water scrubbing systems and/or filtering systems, like carbon filters (using activated carbon or impregnated carbon) can be used. Water sprays and/or dry or wet scrubbers can be used. Any combination of these various devices, methods, systems, can be used in the process of the present invention. The devices, methods, systems can be used once or multiple times in any series and/or locations in the process. The methods/devices described in U.S. Pat. Nos. 6,464,756; 6,183,542; 5,895,519; 5,484,512; 5,458,748; 4,663,134; 4,379,130; 4,344,920; 4,344,779; 4,223,735; 5,385,689; 6,511,529 B1; 6,482,367 B1; 6,333,015 B1; 5,681,371; 4,249,920; 4,216,001; 4,008,056; 3,976,727; 5,661,987; 5,354,361; 4,983,190; 4,957,523; 4,299,595; 6,527,828 B2; 6,030,591; 5,843,395; 4,910,002; and 3,976,451 can be used and these patents are incorporated in their entirety by reference herein.

In one or more embodiments, the $CO_2$ has a purity of at least 95% (by vol. %) or more, such as from about 95% to about 99.99% $CO_2$, or from about 98% to about 99.995% $CO_2$, and the like.

In one or more embodiments of the present invention, the amount of carbon black produced/recovered compared to the amount of gas produced/recovered, such as hydrogen gas and/or carbon dioxide, can be optimized from a production point of view or economic point of view. For instance, various relative amounts of carbon black and one or more gases can be obtained in the processes of the present invention. For instance, from 20 wt % to 85 wt % of the product stream can be carbon black. Other ranges include from about 30 wt % to about 80 wt %, from about 40 wt % to 80 wt %, or from about 50 wt % to 80 wt % of the product stream is carbon black.

In the present invention, by achieving a combination of forming sufficient amounts of carbon black with sufficient amounts of hydrogen gas and carbon monoxide, the sulfur emissions can be greatly reduced. For instance, large portions, such as 30 weight percent to about 60 weight percent of the sulfur originally present in the hydrocarbon feedstock, can be removed by the formation of the carbon black and is present on and/or with the carbon black. The remaining portion of sulfur can be removed by sulfur removal techniques as described above or can be removed by the refinery once the remaining parts of the product stream are transferred to the refinery or to the user of hydrogen gas.

In an additional embodiment of the present invention, a combined facility containing a carbon black manufacturing plant and a refinery plant or user of hydrogen gas or synthesis gas can be utilized. The carbon black manufacturing plant has a carbon black reactor, such as a staged carbon black reactor, and means to remove carbon black from a product stream; means to remove sulfur from a product stream; optional means to introduce steam to the product stream; optional means to remove $CO_2$; and means to transfer hydrogen gas or synthesis gas produced from the carbon black manufacturing plant to a refinery or other facility. The combined facility can be optionally designed so that none of the product stream is recycled back to the carbon black staged reactor.

With respect to the means to remove carbon black from a product stream, as an example, the product stream can be washed with a liquid, such as water, to remove the carbon black. Other techniques to remove carbon black from a product stream include, but are not limited to, filtering with porous media.

With respect to the means to remove sulfur from the product stream, as indicated above, conventional scrubbers that can remove sulfur containing species can be used. With respect to the optional means to remove $CO_2$, conventional scrubbers that can remove $CO_2$ can be used.

With respect to means to transfer the hydrogen gas to the refinery or user of hydrogen gas or synthesis gas, any technique or piping arrangement can be used to pump the hydrogen gas to the refinery. Storage tanks and the like can be used.

In another embodiment of the present invention, the present invention relates to carbon black produced by the above-described processes. With the process of the present invention, essentially any type of conventional carbon black can be made, such as having a DBP oil absorption from about 30 to about 1000 cc/100 g and with a BET surface area of from about 10 to about 1000 $m^2/g$. Any ASTM Specification for carbon black can be produced by the process of the present invention. The process of the present invention permits one to form a higher structure carbon black than ever before using an air oxidant in a carbon black furnace.

By way of the present invention, the carbon blacks produced can have various chemical compositions. For instance, the carbon blacks can have the following chemical makeup:
Carbon: 97.3 to 99.3%
Hydrogen: 0.2 to 0.4%
Oxygen: 0.2 to 1.2%
Sulfur: 0.2 to 1.2%
Ash: 0.1 to 1.0%
Volatility Levels: 0.6 to 1.5%

In at least one embodiment, the present invention can make a variety of N-series carbon blacks in accordance with ASTM-D1765. For instance, the carbon blacks that can be made by the processes of the present invention can be N100, N200, N300, N500, N700, or N990 series carbon blacks. More particularly, examples of carbon blacks that can be made by the processes of the present invention include N110, N121, N220, N220, N231, N234, N299, N326, N330, N339, N347, N351, N358, N375, N539, N550, N650, N660, N683, N762, N765, N774, N990, and the like, and have the standard properties associated with these ASTM carbon blacks with respect to iodine adsorption, DBPA, CTAB, nitrogen surface area, tinting strength, and the like. For purposes of the present invention, the iodine adsorption is based upon ASTM D-1510, nitrogen surface area is based upon ASTM D-3037, CTAB surface area is based upon ASTM D-3765, DBP adsorption is based upon ASTM D-2414, 24M4-DPB absorption is based upon ASTM D-3493, tint strength is based upon ASTM D-3265, volatility is based upon ASTM D-1620, extractables is based upon ASTM D-3392, ash content is based upon ASTM D-1506, and sulfur content is based upon ASTM D-1619.

For purposes of the present invention, the carbon black that can be made by the process can be silicon-treated carbon blacks, silica-coated carbon blacks, metal-treated carbon blacks, and the like, such as described in U.S. Pat. Nos. 6,709,506; 6,686,409; 6,364,944; 6,197,274; 6,150,453; 6,028,137; 5,977,213; 5,948,835; and 5,877,238, all incorporated in their entirety by reference herein.

The carbon black of the present invention can be used in conventional ways such as a filler, reinforcing agent, and/or pigment and be useful in elastomers, in toners, in inks, in polymers, in plastics, and the like.

With the present invention, the total emissions of $CO_2$, as well as sulfur emissions, are drastically reduced especially in view of the combined facility operation. Emissions can essentially be substantially reduced. Thus, the present invention provides a unique "green" facility which makes use of all of the reactive components in an efficient and effective way.

Applicants specifically incorporate the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Unless stated otherwise, gas purity levels and % are by volume %. Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof.

What is claimed is:

1. A method to produce at least one gas, wherein said gas comprises at least hydrogen gas, said method comprising:
   (a) in a carbon black reactor, converting at least a portion of at least one hydrocarbon feedstock to carbon black in the presence of combustion gases generated by burning a fuel in a gas consisting essentially of oxygen and nitrogen, wherein said carbon black is present in a product stream and said product stream comprises carbon black, one or more impurities, hydrogen gas, and CO gas, wherein said impurities comprise sulfur-containing material or nitrogen-containing material or both, wherein said fuel is a portion of said hydrocarbon feedstock or a separate fuel source;
   (b) removing substantially all of the carbon black from said product stream, wherein said carbon black removed in step (b) is a carbon black within at least an ASTM specification for carbon blacks with respect to at least structure and surface area;
   converting at least a portion of said CO gas in said product stream to $CO_2$; and
   (c) removing at least a portion of the impurities including nitrogen from said product stream, transferring said product stream after step (c) to a process unit for use as a fuel or chemical feedstock, wherein said product stream has 1 wt % or less nitrogen present, and recovering said product stream after step (c), wherein said product stream after said converting of CO to $CO_2$ and said removing of impurities comprises hydrogen gas in an amount of from about 90% to about 99.99% by volume of said product stream.

2. The method of claim 1, wherein said converting at least a portion of said CO gas to $CO_2$ comprises contacting said product stream containing said CO with water or steam in a shift reactor to produce additional hydrogen gas and $CO_2$ in said product stream.

3. The method of claim 1, further comprising substantially removing and optionally recovering said $CO_2$.

4. The method of claim 3, wherein said substantially removing said $CO_2$ comprises removing $CO_2$ by processing said product stream containing $CO_2$ through at least one scrubber, or at least one pressure swing adsorber, or at least one membrane, or one or more scrubbers, or one or more acceptor materials, or any combination thereof.

5. The method of claim 2, wherein said hydrogen gas is purified by passing said hydrogen through one or more pressure swing adsorbers or one or more membranes or combinations thereof.

6. The method of claim 1, wherein said method occurs without recycling said product stream to said reactor at step (a).

7. The method of claim 1, wherein said at least one hydrocarbon feedstock comprises a primary hydrocarbon feedstock and at least one secondary hydrocarbon feedstock, wherein at least a portion of said primary hydrocarbon feedstock is converted to carbon black downstream of where said secondary hydrocarbon feedstock is introduced into said reactor.

8. The method of claim 1, wherein said reactor is a staged reactor.

9. The method of claim 1, further comprising introducing said hydrocarbon feedstock into said reactor by multi-staged additions.

10. The method of claim 1, wherein at least 20% by weight of all sources of carbon being introduced into said reactor is recovered in the form of carbon black.

11. The method of claim 1, wherein at least 30% by weight of all sources of carbon being introduced into said reactor is recovered in the form of carbon black.

12. The method of claim 1, wherein at least 50% by weight of all sources of carbon being introduced into said reactor is recovered in the form of carbon black.

13. The method of claim 1, wherein at least 60% by weight of all sources of carbon being introduced into said reactor is recovered in the form of carbon black.

14. The method of claim 1, wherein from 25% to about 70% by weight of all sources of carbon being introduced into said reactor is recovered in the form of carbon black.

15. The method of claim 1, further comprising introducing at least one fuel into said reactor at a point prior to or where said converting of at least a portion of at least one hydrocarbon feedstock to carbon black is occurring.

16. The method of claim 15, wherein said fuel comprises a natural gas.

17. The method of claim 1, wherein said removing at least a portion of the impurities from said product stream comprises passing said product stream through at least one scrubber that removes sulfur containing species or nitrogen containing species or both.

18. The method of claim 17, wherein said product stream, after passing said product stream through at least one scrubber that removes sulfur containing species, has a sulfur amount in said product stream of 100 ppm or less.

19. The method of claim 1, wherein the % by volume of said hydrogen gas and the wt % of carbon black in said product stream is controlled by varying the type of said hydrocarbon feedstock, type of fuel when present, ratio of oxygen to fuel when present, ratio of $O_2$ to hydrocarbon feedstock, temperature of feed gases, temperature of said hydrocarbon feedstock, the stoichiometric combustion rate, the stoichiometric carbon to hydrogen ratio in said hydrocarbon feedstock, or relative feed rates of oxygen, fuel, and hydrocarbon feedstock, or combinations thereof.

20. The method of claim 1, wherein said converting at least a portion of said CO gas to $CO_2$ occurs prior to said step of removing at least a portion of the impurities.

21. The method of claim 1, wherein said converting at least a portion of said CO gas to $CO_2$ occurs during and/or after said step of removing at least a portion of the impurities.

22. The method of claim 1, wherein an amount of CO gas remains in said product stream after converting at least a portion of said CO in said product stream to $CO_2$ and said process further comprises removing at least a portion of the remaining CO gas from said product stream.

23. The method of claim 22, wherein said removing of a portion of said CO gas comprises passing said product stream through at least one pressure swing adsorber.

24. The method of claim 23, wherein said removing of CO gas by at least one pressure swing adsorber further removes at least a portion of methane, nitrogen, or combinations thereof which are present in said product stream as impurities.

25. The method of claim 23, wherein said CO gas that is removed is recycled or reprocessed through a shift reactor to convert a further portion of said CO to $CO_2$.

26. The method of claim 1, wherein said oxygen has a purity of at least 90% by weight.

27. The method of claim 1, wherein said impurities, excluding H20, based on a dry weight basis, comprise 1% or less of the product stream.

28. The method of claim 1, wherein said impurities, excluding H20, based on a dry weight basis, comprise 5% or less of the product stream.

29. The method of claim 1, wherein said reactor has a combustion temperature of from about 2500° F. to about 5500° F.

30. The method of claim 1, wherein said reactor has a combustion temperature of from about 4000° F. to about 5000° F.

31. The method of claim 1, wherein said hydrocarbon feedstock has a sulfur level of at least 4% by weight of said hydrocarbon feedstock.

32. The method of claim 1, wherein said hydrocarbon feedstock has a sulfur level of from about 0.1% to about 5% by weight of said hydrocarbon feedstock.

33. The method of claim 1, wherein said method results in gaseous emissions at the location of the reactor of sulfur in gas phase species into the atmosphere of less than 5% by weight based on the total amount of sulfur fed into said method.

34. The method of claim 1, wherein said method results in gaseous emissions at the location of the reactor of sulfur in gas phase species into the atmosphere of less than 10 wt % based on the total amount of sulfur fed into said method.

35. The method of claim 1, wherein said method results in gaseous emissions at the location of the reactor of sulfur in gas phase species into the atmosphere of less than 20 wt % based on the total amount of sulfur fed into said method.

36. The method of claim 1, wherein said method results in gaseous emissions at the location of the reactor of nitrogen in gas phase species into the atmosphere of less than about 0.01 metric tonnes per metric tonne of carbon black produced.

37. The method of claim 1, wherein said method results in gaseous emissions at the location of the reactor of carbon in gas phase species into the atmosphere of less than 10% by weight based on the total carbon fed into said method.

38. The method of claim 1, wherein said method forms carbon black in the reactor in an amount of greater than 20% by weight of the product stream, based on a dry basis.

39. The method of claim 1, wherein said method forms carbon black in the reactor in an amount of greater than 25% by weight of the product stream, based on a dry basis.

40. The method of claim 15, wherein said fuel and said oxygen are present in a fuel/oxygen equivalence ratio of from about 0 to about 2.

41. The method of claim 1, wherein a portion of the sulfur present in said hydrocarbon feedstock is removed by the formation of said carbon black and is present with said carbon black.

42. The method of claim 1, wherein a portion of metal present in said hydrocarbon feedstock is removed by the formation of said carbon black and is present with said carbon black.

43. The method of claim 1, wherein said removing of said carbon black is achieved by cyclone or filtering and/or washing said product stream containing said carbon black with water.

44. The method of claim 1, wherein said process unit comprises an oil refinery.

45. The method of claim 42, wherein the process of forming said carbon black present in a product stream occurs at a carbon black manufacturing plant and said product stream after step (c) is transferred to an oil refinery.

46. The method of claim 2, wherein said steam is introduced in the presence of a catalytic bed.

47. The method of claim 1, wherein said product stream contains at least $H_2$ and CO and said $H_2$ and CO are present in a mol ratio of from about 0.5 to 2 in said product stream prior to removing said carbon black.

48. The method of claim 1, wherein said product stream contains at least $H_2$ and CO and said $H_2$ and CO are present in a mol ratio of from 2 to about 3.5 in said product stream prior to removing said carbon black.

49. The method of claim 1, wherein said hydrocarbon feedstock has a hydrogen to carbon mol ratio of from 0.5 to 3.5.

50. The method of claim 3, wherein $CO_2$, that is recovered, has a purity level of from about 90% to about 99.99%.

51. The method of claim 1, wherein said method results in gaseous emissions at the location of the reactor of nitrogen in gas phase species into the atmosphere of less than about 0.1 metric tonnes per metric tonne of carbon black produced.

52. The method of claim 1, wherein said method results in gaseous emissions at the location of the reactor of nitrogen in gas phase species into the atmosphere of less than about 1 metric tonnes per metric tonne of carbon black produced.

53. The method of claim 1, wherein said method forms carbon black in the reactor in an amount of greater than 30% by weight of the product stream, based on a dry basis.

54. The method of claim 1, wherein said method results in gaseous emissions at the location of the reactor of carbon in gas phase species into the atmosphere of less than 20% by weight based on the total carbon fed into said method.

55. The method of claim 1, wherein said method results in gaseous emissions at the location of the reactor of carbon in gas phase species into the atmosphere of less than 30% by weight based on the total carbon fed into said method.

56. A method to produce at least one gas, wherein said gas comprises at least hydrogen gas, said method comprising:
   (a) in a carbon black reactor, converting at least a portion of at least one hydrocarbon feedstock to carbon black in the presence of combustion gases generated by burning a fuel in a gas consisting essentially of oxygen, wherein said carbon black is present in a product stream and said product stream comprises carbon black, one or more impurities, hydrogen gas, and CO gas, wherein said impurities comprise sulfur-containing material or nitrogen-containing material or both, wherein said fuel is a portion of said hydrocarbon feedstock or a separate fuel source;
   (b) removing substantially all of the carbon black from said product stream, wherein said carbon black removed in step (b) is a carbon black within at least an ASTM specification for carbon blacks with respect to at least structure and surface area;
   converting at least a portion of said CO gas in said product stream to $CO_2$; and
   (c) removing at least a portion of the impurities from said product stream and recovering said product stream after step (c), transferring said product stream after step (c) to a process unit for use as a fuel or chemical feedstock, wherein said method occurs without recycling said product stream to said reactor at step (a), wherein said product stream after said converting of CO to $CO_2$ and said removing of impurities comprises hydrogen gas in an amount of from about 90% to about 99.99% by volume of said product stream.

\* \* \* \* \*